June 7, 1955  J. R. DENNIS ET AL  2,710,360
BRUSH HOLDER SUPPORT FOR ROTATING ELECTRICAL MACHINES
Filed May 19, 1952
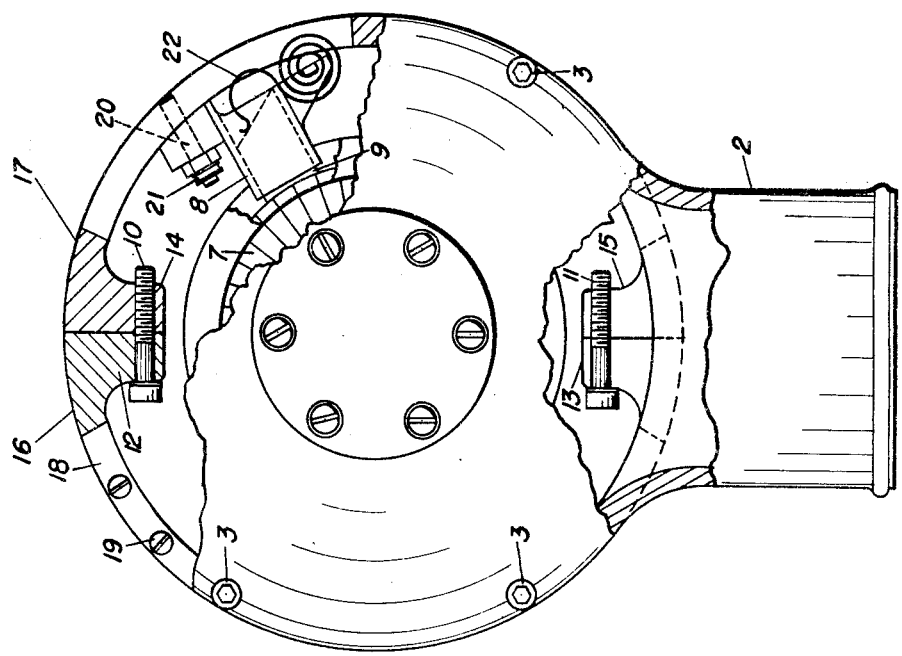
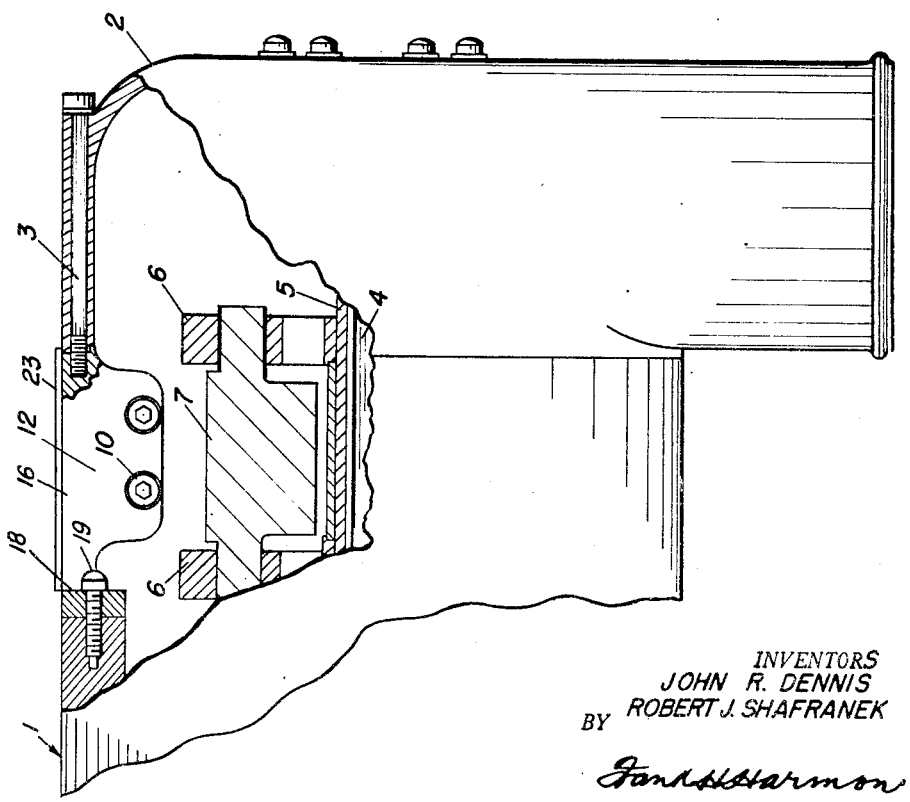
INVENTORS
JOHN R. DENNIS
ROBERT J. SHAFRANEK
BY
Frank H Harmon
ATTORNEY

United States Patent Office 2,710,360
Patented June 7, 1955

2,710,360

BRUSH HOLDER SUPPORT FOR ROTATING ELECTRICAL MACHINES

John R. Dennis, Bedford, and Robert J. Shafranek, Cleveland, Ohio, assignors to Jack & Heintz, Inc., Cleveland, Ohio, a corporation of Delaware Application May 19, 1952, Serial No. 288,613

4 Claims. (Cl. 310—239)

This invention relates in general to commutators and more particularly to improvements in brush holder supports for rotating electrical machines. One of the primary objects of the invention is to provide a practical means of assembling and disassembling a rotating electrical machine which has a fully compensated direct current shrink ring commutator and in which the shrink rings extend radially beyond the commutator surface.

The conventional practice is to use a fixed combination brush holder and bearing support with conventional V ring commutators and to use removable brush boxes or retractable brush supports as a part of the brush holder for fully compensated direct current shrink ring commutators.

We, therefore propose to provide a construction that is less expensive than the conventional removable brush boxes or retractable brush supports in order to make possible a more reliable and consistent positioning of the brush boxes. We also propose to provide a longitudinally split brush holder support construction distinct from the field magnet so as to obtain a simple and economical way of assembling and disassembling electrical machines utilizing fully compensated direct current shrink ring commutators where the shrink rings extend radially beyond the commutator surface.

With the foregoing and other objects in view, the invention resides in the combination of parts and in the details of construction hereinafter set forth in the following specification and appended claims, certain embodiments thereof being illustrated in the accompanying drawings, in which:

Fig. 1 is a fragmentary side view, and
Fig. 2 is a fragmentary end view of my invention.

Referring more particularly to the drawings, we have shown one form that our invention may take as applied to a commutator having a housing E generally indicated at 1 in Figure 1. The commutator has the usual driving quill shaft 4 and shaft 5 with shrink rings 6 for supporting a series of commutator bars 7. In accordance with the usual practice, the machine includes a series of brush holders 8, releasably secured by screw pins 20 and nuts 21 to the brush holder support, to be later described in detail for carrying brushes 9 for engagement with the commutator bars 7.

Instead of forming the brush head in one piece, we propose to form it in two semi-cylindrical portions 16 and 17 and join them together by means of screw bolts 10 and 11. In the drawings, we have shown the bolts 10 and 11 extending through radially inwardly extending flanges 12 and 13 of brush head portion 16 and flanges 14 and 15 in brush head portion 17. It is to be understood that these flanges may be dispensed with as desired and other means provided in the brush head portions 16 and 17 for receiving bolts 10 and 11 to releasably secure the two brush head portions 16 and 17 together.

As shown in Figure 1, the two semi-cylindrical brush holder supports 16 and 17 are releasably secured to the end of the commutator housing 1 by bolts 19 extending through wall 18 of the supports and into the housing 1. Circumferentially surrounding the brush holder supports 16 and 17, throughout the major portion of their lengths, is releasably secured a band 23, merely for covering the supports 16 and 17. To the opposite end of the brush holder supports 16 and 17 an air intake blast cap, or air intake scoop 2, is releasably secured by bolts 3. This arrangement makes for ease of assembly and disassembly of the brush holder assembly.

This construction allows the use of fixed brush holders 8 in our commutator construction. Ordinarily the shrink rings would interfere with the brush holders and it would be impossible to assemble or disassembly the machine without first removing all of the brush holders. It also eliminates the necessity for using a fixed combination brush holder and bearing support. Moreover, it eliminates the necessity of using removable brush boxes or retractable brush supports as a part of the brush holder.

From the foregoing it will be seen that we have provided a construction that is more simple and less expensive than removable brush boxes or retractable brush supports. Our split brush head construction makes possible a more reliable and consistent positioning of the brush boxes. Moreover, we have provided a simple and economical way of assembling and disassembling machines utilizing shrink ring commutators where the shrink rings extend radially beyond the commutator surface.

We claim:

1. In a fully compensated direct current commutator construction including commutator shaft, a series of commutator bars held and positioned by shrink rings, a series of brush holders and brushes supported thereby for engagement with said commutator bars, a support for said brush holders that is split longitudinally in a plane parallel with the axis of said shaft to comprise a plurality of complementary sections releasably secured together.

2. In a fully compensated direct current commutator construction including commutator shaft, a series of commutator bars held and positioned by shrink rings, a series of brush holders and brushes supported thereby for engagement with said commutator bars, a support for said brush holders that is split longitudinally in a plane parallel with the axis of said shaft to comprise a plurality of longitudinally extending complementary portions releasably secured together.

3. In a fully compensated direct current commutator construction including commutator shaft, a series of commutator bars held and positioned by shrink rings, a series of brush holders and brushes supported thereby for engagement with said commutator bars, a support for said brush holders that is split longitudinally in a plane parallel with the axis of said shaft to comprise a plurality of longitudinally extending arcuate complementary sections releasably secured together.

4. In a fully compensated direct current commutator construction including commutator shaft, a series of commutator bars held and positioned by shrink rings, a series of brush holders and brushes supported thereby for engagement with said commutator bars, a support for said brush holders that is split longitudinally in a plane parallel with the axis of said shaft to comprise a pair of semi-cylindrical longitudinally extending complementary sections releasably secured together.

References Cited in the file of this patent

UNITED STATES PATENTS

| Number | Name | Date |
|---|---|---|
| 569,802 | Schmid | Oct. 20, 1896 |
| 1,794,291 | Hobart | Feb. 24, 1931 |
| 2,000,715 | Penney | May 7, 1935 |